United States Patent
Song et al.

(10) Patent No.: US 10,136,405 B2
(45) Date of Patent: Nov. 20, 2018

(54) SYSTEM AND METHOD FOR RSRP MEASUREMENT IN AN LTE UE RECEIVER

(71) Applicant: Samsung Electronics Co., Ltd., Gyeonggi-do (KR)

(72) Inventors: Kee-bong Song, San Diego, CA (US); Shengshan Cui, San Diego, CA (US); Hairuo Zhuang, San Diego, CA (US); Yangwen Liang, San Diego, CA (US); Vignesh Sethuraman, La Jolla, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/964,212

(22) Filed: Dec. 9, 2015

(65) Prior Publication Data

US 2017/0086133 A1      Mar. 23, 2017

Related U.S. Application Data

(60) Provisional application No. 62/220,481, filed on Sep. 18, 2015, provisional application No. 62/220,493, filed on Sep. 18, 2015.

(51) Int. Cl.
*H04W 48/16* (2009.01)
*H04B 17/318* (2015.01)
*H04W 56/00* (2009.01)
*H04B 17/391* (2015.01)

(52) U.S. Cl.
CPC ........ *H04W 56/004* (2013.01); *H04B 17/318* (2015.01); *H04B 17/391* (2015.01); *H04W 56/0035* (2013.01); *H04W 56/0055* (2013.01); *H04B 17/3911* (2015.01); *H04B 17/3912* (2015.01)

(58) Field of Classification Search
CPC .... H04W 48/16; H04W 24/08; H04L 43/028; H04L 47/27
See application file for complete search history.

(56) References Cited

U.S. PATENT DOCUMENTS

| | | | |
|---|---|---|---|
| 8,233,524 B2 | 7/2012 | Thirumoorthy | |
| 9,769,838 B2* | 9/2017 | You | H04W 72/085 |
| 2012/0172041 A1* | 7/2012 | Krishnamurthy | H04J 11/005 |
| | | | 455/436 |
| 2013/0273912 A1* | 10/2013 | Xu | H04W 24/08 |
| | | | 455/434 |
| 2013/0343336 A1* | 12/2013 | Bai | H04W 72/082 |
| | | | 370/329 |
| 2014/0022988 A1* | 1/2014 | Davydov | H04B 7/024 |
| | | | 370/328 |

(Continued)

*Primary Examiner* — Asghar H Bilgrami
(74) *Attorney, Agent, or Firm* — The Farrell Law Firm, P.C.

(57) ABSTRACT

Apparatuses (including user equipment (UE) and modem chips for UE), systems, and methods for calculating more accurate Reference Signal Received Power (RSRP) measurements and/or detecting/eliminating ghost cells from a list of (supposed) neighboring cells are described. In one method, the cross-correlations between adjacent Cell-specific Reference Signals (CRSs) are used to calculate the RSRP and to detect any ghost cells in a list of (supposed) neighboring cells. Any detected ghost cell may be deleted from any searches and measurements by the UE, and may also be reported to the network.

20 Claims, 6 Drawing Sheets

(56) References Cited

U.S. PATENT DOCUMENTS

| | | | |
|---|---|---|---|
| 2014/0071960 A1* | 3/2014 | Gorokhov | H04W 24/02 370/336 |
| 2014/0078912 A1* | 3/2014 | Park | H04L 5/0048 370/252 |
| 2015/0071103 A1* | 3/2015 | Xu | H04L 43/028 370/252 |
| 2015/0172976 A1* | 6/2015 | Kazmi | H04W 64/003 455/434 |

* cited by examiner

- RRM schedules SRCH and SRCH returns results to RRM
    * HAL prunes ghost cell out of SRCH results
- RRM schedules MEAS and expects results (even for ghost cells)

* make use of negative RSRP and (possibly SRCH info)

FIG. 4C

SYSTEM AND METHOD FOR RSRP MEASUREMENT IN AN LTE UE RECEIVER

PRIORITY

The present application claims priority under 35 U.S.C. § 119(e) to U.S. Provisional Application No. 62/220,481, entitled "SYSTEM AND METHOD FOR RSRP MEASUREMENT IN AN LTE UE RECEIVER," which was filed on Sep. 18, 2015, and to U.S. Provisional Application No. 62/220,483, entitled "SYSTEM AND METHOD FOR CELL SEARCH ENHANCEMENT IN AN LTE SYSTEM," which was filed on Sep. 18, 2015, the contents of each of which are incorporated herein by reference.

FIELD OF THE DISCLOSURE

The present disclosure relates generally to improving signal measurement reporting from User Equipment (UE) in a Long Term Evolution (LTE) cellular communication network and, more specifically, to eliminating ghost cells and improving the accuracy of UE measurement reports.

BACKGROUND

Figure 1:
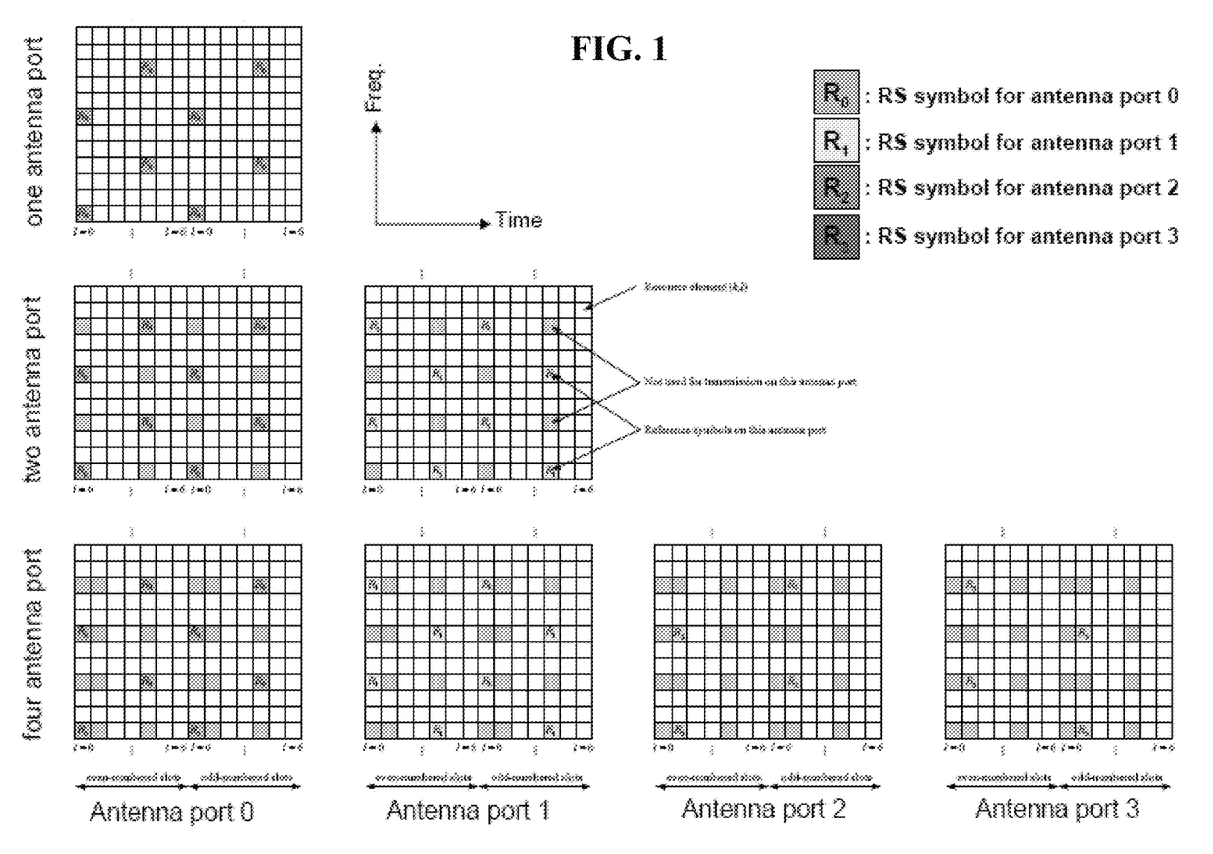
FIG. 1 includes schematic diagrams showing the positions of Cell-specific Reference Signals (CRSs) within each subframe based on the number of transmitting antennas (1, 2, or 4)

In an LTE network, the UE is responsible for, among other things, measuring/estimating signal strength in its cell (or primary cell) and neighboring cells (or secondary cells), and reporting such measurements to the network. One such measurement is the Reference Signal Received Power (RSRP), which measures the power of a cell's received reference signals (RSs). More specifically, the UE measures the cell-specific RSs (CRSs) for that cell. FIG. 1 shows the distribution of CRSs within a subframe depending on the number of antennas being used in a case of a normal cyclic prefix (CP). An LTE Frequency Division Duplexing (FDD) subframe is $\frac{1}{10}^{th}$ of a frame and includes two slots, each of which has 7 symbols (labelled 0 through 6) and 12 subcarriers. As shown in FIG. 1, the CRSs are always in symbol 0 (the first) and symbol 4 (the fifth) of every slot and, within a symbol, the CRSs are always separated by 6 subcarriers.

The UE could be provided with the list of cells to measure (or neighbor list) by the network or by a cell searcher which plays the role of finding/identifying LTE cells. In the latter case, however, sometimes the list of cells include a ghost cell, which is not a cell at all, but rather the false identification of a cell where there isn't one. Such ghost cells degrade performance system-wide and inevitably waste resources.

More specifically, field tests have shown that if a UE sends a measurement report that includes ghost cells to the network, the UE will suffer performance degradation (such as radio link failure). An LTE feature may include using the UE to build and correct the list of cells. For example, the network relies upon the UE to report any cells it has detected which are not on the network's neighbor list. If the UE reports a ghost cell in such a scenario, it may trigger the network to initiate the Automatic Neighbor Relation (ANR) procedure, which is destined to fail (being initiated by a non-existent cell) and may further cause a radio link failure.

SUMMARY

Accordingly, the present disclosure has been made to address at least the problems and/or disadvantages described above and to provide at least the advantages described below. In one aspect of the present disclosure, the capability to detect ghost cells in a neighbor list is provided to a UE, and accordingly the ability to suppress ghost cells from being reported to the network. In another aspect of the present disclosure, the accuracy of UE RSRP measurements is improved.

According to one aspect of the present disclosure, a method for User Equipment (UE) is provided, including storing received cell-specific reference signals (CRSs); calculating cross-correlations between pairs of adjacent CRSs among the stored CRSs; summing cross-correlation values for each pair, across a frame; and using the cross-correlation sums for each pair over the frame to calculate the Reference Signal Receive Power (RSRP) for one or more cells.

According to another aspect of the present disclosure, a method for User Equipment (UE) is provided, including storing cell-specific reference signals (CRSs) received a plurality of cells; calculating cross-correlations between pairs of adjacent CRSs among the stored CRSs; summing cross-correlation values for each pair, across a frame; and using the cross-correlation sums for each pair over the frame to detect any ghost cells in the plurality of cells.

According to another aspect of the present disclosure, a User Equipment (UE) is provided, including one or more non-transitory computer-readable media, wherein at least one of the one or more non-transitory computer-readable media stores a set of instructions; and one or more processors, wherein at least one of the one or more processors, when executing the set of instructions stored in the at least one of the one or more non-transitory computer-readable media, controls the UE to perform at least the following steps: storing received cell-specific reference signals (CRSs); calculating cross-correlations between pairs of adjacent CRSs among the stored CRSs; and summing cross-correlation values for each pair, across a frame.

BRIEF DESCRIPTION OF THE DRAWINGS

The above and other aspects, features, and advantages of embodiments of the present disclosure will be more apparent from the following detailed description taken in conjunction with the accompanying drawings, in which.

DETAILED DESCRIPTION OF EMBODIMENTS OF THE PRESENT DISCLOSURE

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Various embodiments may include one or more elements. An element may include any structure arranged to perform certain operations. Although an embodiment may be described with a limited number of elements in a certain arrangement by way of example, the embodiment may include more or less elements in alternate arrangement as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Methods, systems, and apparatuses according to embodiments of the present disclosure provide more accurate RSRP measurement results for true cells (i.e., existing cells) and the capability to detect ghost cells and consequently prevent ghost cells from being reported to the network and/or used for RSRP measurement.

In general, UEs estimate RSRP by normalizing the received CRS power either in the time or frequency domain. In either case, the received CRS tone/signal must first be descrambled using a locally generated CRS scramble sequence before the power of the received signal can be measured/computed. Furthermore, the CRS signal must be descrambled before noise/interference can be removed to enhance quality. However, descrambling only works if the locally generated scramble sequence belongs to an existing cell. If the locally generated sequence belongs to a ghost cell, the above procedure (which is based on power measurement) is not effective to guarantee low power measurement of the ghost cells.

More specifically, methods, systems, and apparatuses according to embodiments of the present disclosure use the real (I) and imaginary (Q) parts of the calculated cross-correlation between adjacent CRS tones/signals to detect ghost cells. Because the scrambling sequences of true cells and ghost cells are presumably not correlated, accumulating/normalizing cross-correlations across different groups of CRS tones/signals in the I/Q domain (as opposed to the power domain) should indicate the presence of ghost cells. More specifically, the real part of the calculated cross-correlation will be a negative value for ghost cells in about 50% of measurements, but will always be positive for true cells. This suggests that, about 50% of the time, ghost cells can be detected merely by inspecting the sign (+/−) of the real part of the cross-correlation metric.

Figure 2:
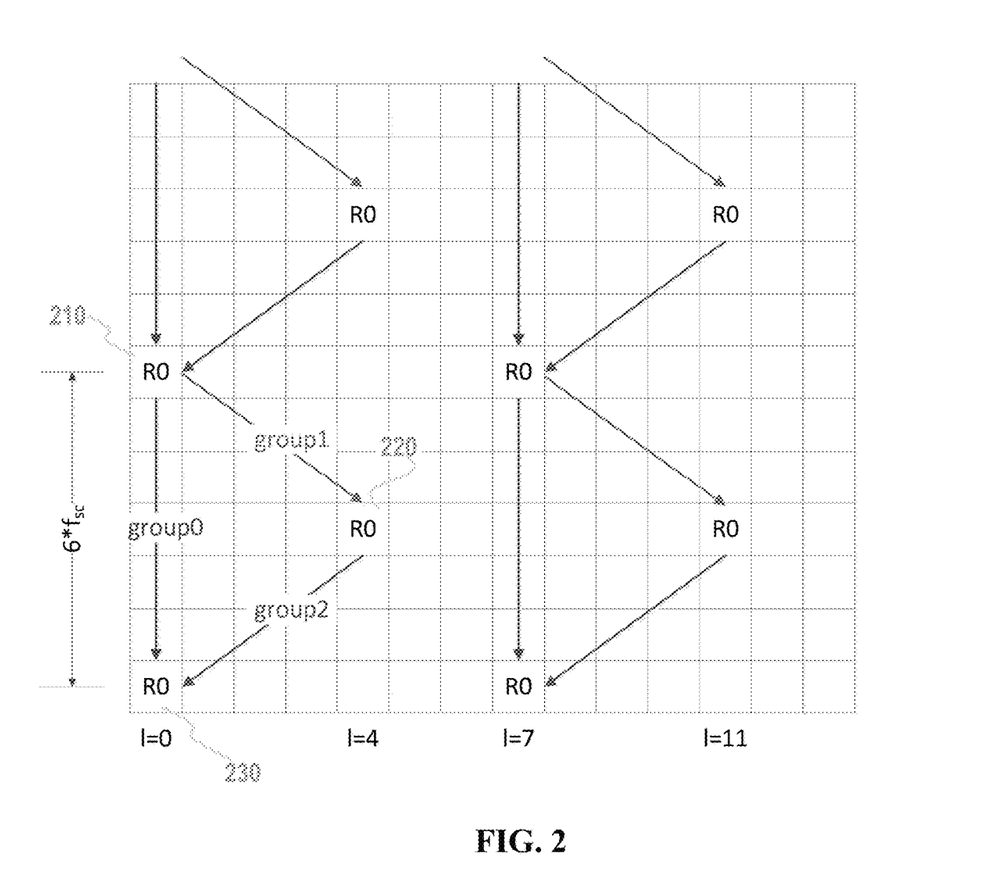
FIG. 2 is a schematic diagram of a subframe showing the groups of CRS pairs subject to cross-correlation according to an embodiment of the present disclosure.

FIG. 2 is a schematic diagram of a subframe showing the groups of CRSs subject to cross-correlation according to an embodiment of the present disclosure. In FIG. 2, each CRS is labelled "R0" (thereby indicating these are the CRSs of antenna port 0) and, as discussed above in reference to FIG. 1, are separated by 6 subcarriers in the frequency domain ("6*$f_{sc}$") and occur only in the first ("1=0" and "1=7") and fifth ("1=4" and "1=11") symbols in the time domain.

In this embodiment, the groups consist of pairs of adjacent CRSs. In FIG. 2, three groups of CRS pairs are labelled group0, group1, and group2, although this is only representative, as all of the CRSs in the subframe (and the whole frame) are grouped in this manner, as indicated by the arrows. group0 includes the adjacent pair of CRS R0 210 and CRS R0 230; group1 includes the adjacent pair of CRS R0 210 and CRS R0 220; and group2 includes the adjacent pair of CRS R0 220 and CRS R0 230. The present disclosure is not limited to this particular grouping/pairing, but rather any grouping/pairing may be used which preserves the features of the cross-correlation, as described herein.

Considered in ideal mathematical terms, i.e., assuming there is no residual timing or frequency offset, let an adjacent pair of CRS tones/signals (which also include their scrambling codes) when transmitted be represented as Equation (1)(a):

$$S_{i,j}^s j=1,2 \tag{1)(a)}$$

where index i denotes the index of the cross-correlation pair in this group; j denotes the index of the two CRS tones in the pair; superscript s indicates that the signals are from serving cell. Note that CRS has the property of Equation (1)(b):

$$(S_{i,j}^s)^* S_{i,j}^s = 1, j=1,2 \tag{1)(b)}.$$

Thus, for example, the adjacent pair of CRS R0 210 and CRS R0 230 in group0 would include $S_{i,1}^s$ and $S_{i,2}^s$ when they are transmitted. Assuming that the channel is flat, after being transmitted through channel H with noise/interference N and received by the UE, the CRS tones/signals can be represented as Equations (2)(a) and (2)(b):

$$Y_{i,1} = H S_{i,1}^s + N_{i,1} \tag{2)(a)}$$

$$Y_{i,2} = H S_{i,2}^s + N_{i,2} \tag{2)(b)}$$

After the UE descrambles the received signals, they can be represented as Equations (3)(a) and (3)(b):

$$R_{i,1} = (S_{i,1}^s)^* (H S_{i,1}^s + N_{i,1}) \tag{3)(a)}$$

$$R_{i,2} = (S_{i,2}^s)^* (H S_{i,2}^s + N_{i,2}) \tag{3)(b)}$$

The cross-correlation of descrambled adjacent received CRSs $R_{i,1}$ and $R_{i,2}$ is represented herein as $R_{i,1}(R_{i,2})^*$ and, as shown in Equation (4)(a), equals:

$$R_{i,1}(R_{i,2})^* = |H|^2 + N'_i \tag{4)(a)}$$

where $N'_i$ represents the residual noise component and can be represented as Equation (4)(b):

$$N'_i = H S_{i,2}^s (N_{i,2})^* H^* (S_{i,1}^s)^* N_{i,1} + (S_{i,1}^s)^* N_{i,1} S_{i,2}^s (N_{i,2})^* \tag{4)(b)}$$

When the cross-correlations of all the pairs of that group are summed, the real part of the summation is $|H|^2$ plus noise.

However, when the UE descrambles the supposed signals of a ghost cell, instead of Equations (3)(a) and (3)(b), the signals become, as shown in FIGS. (5)(a) and (5)(b):

$$R_{i,1} = (S_{i,1}^g)^* (H S_{i,1}^s + N_{i,1}) \tag{5)(a)}$$

$$R_{i,2} = (S_{i,2}^g)^* (H S_{i,2}^s + N_{i,2}) \tag{5)(b)}$$

where their cross-correlation becomes, as shown in Equation (6)(a):

$$R_{i,1}(R_{i,2})^* = |H|^2 (S_{i,1}^g)^* S_{i,1}^s S_{i,2}^s (S_{i,2}^g)^* N''_i \tag{6)(a)}$$

where $N''_i$ is the noise term and can be represented as Equation (6)(b):

$$N''_i = (S_{i,1}^g)^* (H S_{i,1}^s) S_{i,2}^g (N_{i,2})^* + S_{i,1}^g H^* (S_{i,2}^s)^* (S_{i,1}^g)^* N_{i,1} + (S_{i,1}^g)^* N_{i,1} S_{i,2}^g (N_{i,2}) \tag{6)(b)}$$

Because the phases of CRS scrambling sequence do not match (i.e., $(S_{i,j}^g)^* S_{i,j}^s$ is not guaranteed to be 1), the real part of the cross-correlation in Equation (6)(a) appears as random with a mean close to zero. When the cross-correlations of all the pairs of that group are summed, the real part of the summation is a random number with a zero mean.

Accordingly, the real part of the summation of the cross-correlations of all the pairs in a group can be used to detect a false or ghost cell. Moreover, this value can also be used to calculate the RSRP in Equation (7) as follows:

$$\widetilde{RSR}P(K) = \frac{\text{Real}\left\{\left(\sum_{i=1}^{K_0} R_{i,1}(R_{i,2})^*\right)_{group0} + \left(\sum_{i=1}^{K_1} R_{i,1}(R_{i,2})^*\right)_{group1} + \left(\sum_{i=1}^{K_2} R_{i,1}(R_{i,2})^*\right)_{group2}\right\}}{K_0 + K_1 + K_2} \quad (7)$$

where $K_m$, m=0, 1, 2 is the number of cross-correlation pairs in group m (m=0, 1, 2), which depends on the measurement bandwidth of the cell. For example, when the LTE system bandwidth is 20 MHz, there may be 100 RB and 200 CRS tones. Therefore, $K_0$=199, while $K_1$, $K_2$ takes values 200 or 199 depending on the cell ID (which determines the frequency shift of the CRS tones on the $4^{th}/11^{th}$ symbols with respect to $0^{th}/4^{th}$ symbols).

This is only one possible RSRP measurement equation according to the present disclosure. Another RSRP measurement equation according to an embodiment of the present disclosure is shown in Equation (8):

$$RSRP(K) = \frac{\left|\sum_{i=1}^{K_0} R_{i,1}(R_{i,2})^*\right|_{group0} + \left|\sum_{i=1}^{K_1} R_{i,1}(R_{i,2})^*\right|_{group1} + \left|\sum_{i=1}^{K_2} R_{i,1}(R_{i,2})^*\right|_{group2}}{K_0 + K_1 + K_2} \quad (8)$$

and other variations would be understood by one of ordinary skill in the art.

As mentioned above, these representative equations were based on assuming no residual timing or frequency offsets. A method where residual timing and frequency offsets are compensated for is discussed in reference to FIG. 3.

Figure 3:
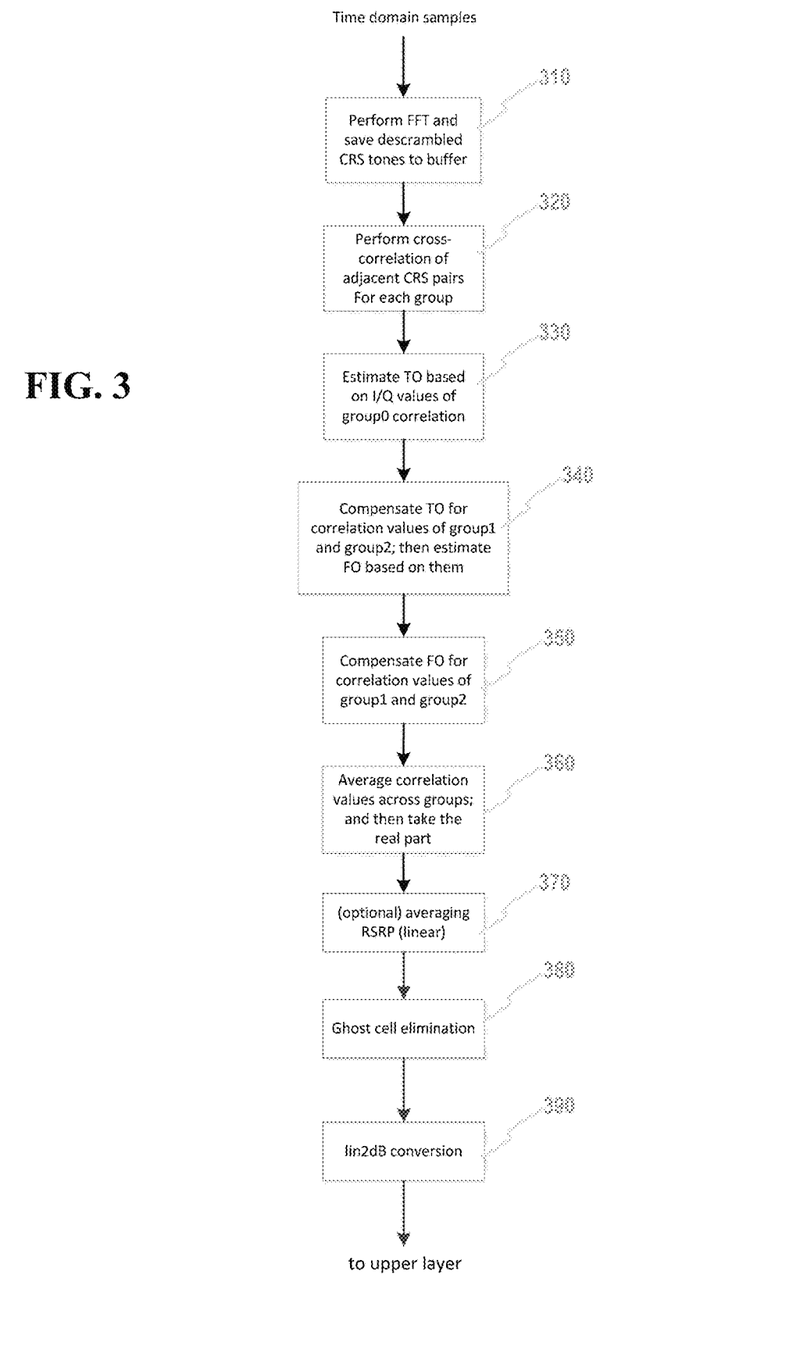
FIG. 3 is a flowchart of a method of RSRP calculation according to an embodiment of the present disclosure.

FIG. 3 is a flowchart of a method of RSRP calculation according to an embodiment of the present disclosure. As stated above, the method in FIG. 3 compensates for the effects of residual timing and frequency offsets.

At 310, time domain samples of the received and descrambled CRS tones/signals are Fast Fourier Transformed (FFT) into the frequency domain and stored in a buffer. Cross-correlations of adjacent CRS pairs are calculated for each group over an entire frame at 320. At 330, the timing offset (TO) is estimated based on the I/Q values of the group0 cross-correlations. Mathematically, Equation (9) denotes the sum of all cross-correlation pairs for groups 0, 1, and 2 (i.e., m=0, 1, 2):

$$\text{group}_m = \sum_{i=1}^{K_m} R_{i,1}(R_{i,2})^* \quad (9)$$

and TO can be estimated as shown in Equation (10):

$$\widehat{\Phi_{TO}} = \text{angle}(\text{group}_0) \quad (10)$$

At 340, the timing offset (TO) calculated at 330 is compensated for the group1 and group2 cross-correlation values. The frequency offset (FO) is then calculated based on the TO-compensated cross-correlations, as shown in Equation (11):

$$\widehat{\theta_{FO}} = \frac{\text{angle}\left(\text{group}_2 e^{-j\widehat{\Phi_{TO}}/2}\right) - \text{angle}\left(\text{group}_1 e^{-j\widehat{\Phi_{TO}}/2}\right)}{2} \quad (11)$$

At 350, the frequency offset (FO) calculated at 340 is compensated for the group1 and group2 cross-correlation values and, at 360, the cross-correlation values are averaged across groups, and then the real part is taken. 350 and 360 can be represented as Equation (12):

$$\widetilde{RSRP}_t = \frac{\text{Real}\left\{\text{group}_0 e^{-j\widehat{\Phi_{TO}}} + \text{group}_1 e^{j\widehat{\theta_{FO}} - j\frac{\widehat{\Phi_{TO}}}{2}} + \text{group}_2 e^{-j\widehat{\theta_{FO}} - j\frac{\widehat{\Phi_{TO}}}{2}}\right\}}{K_0 + K_1 + K_2} \quad (12)$$

At 370, which is optional, the linear RSRP values are averaged ("(optional) averaging RSRP (linear)"). At 380, the ghost cells are eliminated in accordance with the present disclosure. At 390, the linear RSRP measurements are converted to power measurements ("lin2 dB conversion"), which are provided to the upper layer.

The inventors have performed various simulations, using Matlab and a link-level simulator, the details and results of which are attached hereto as an APPENDIX.

Figure 4A:
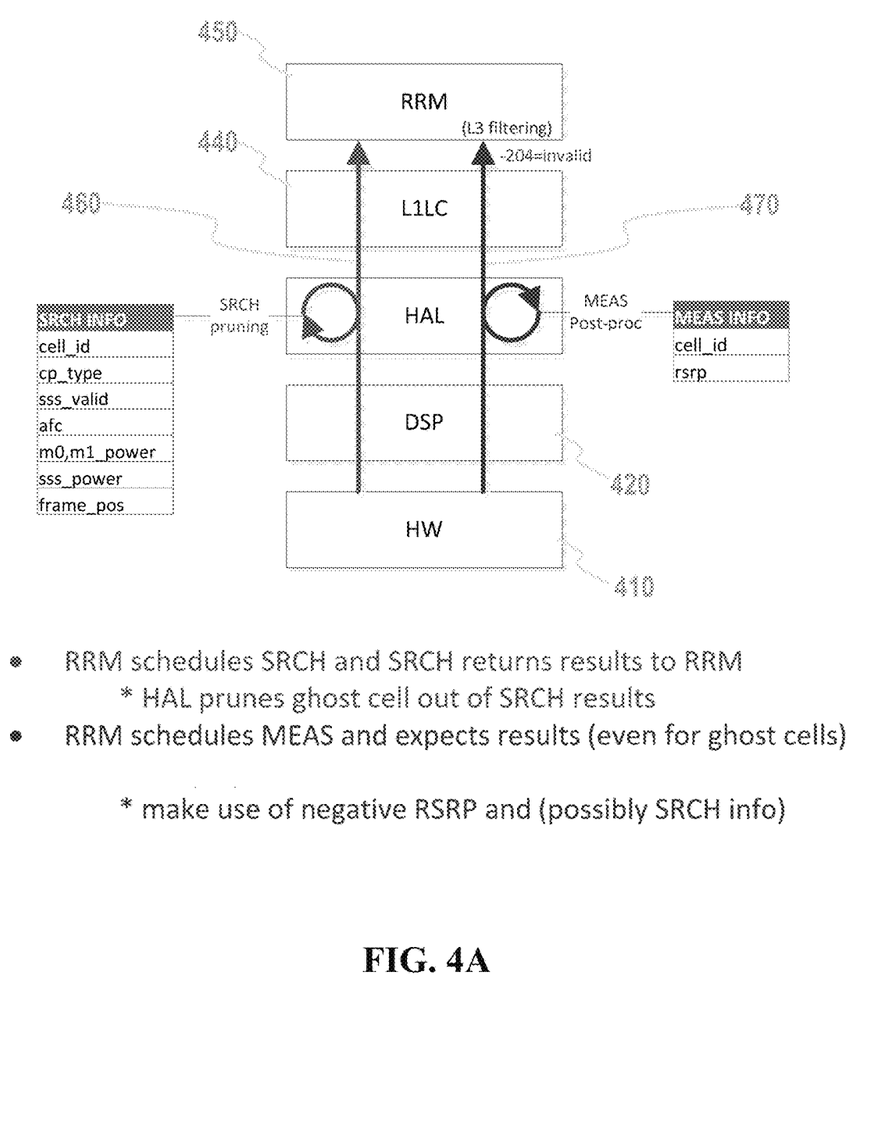
FIG. 4A is an overview of a possible software implementation according to an embodiment of the present disclosure.

An overview of a possible software implementation according to an embodiment of the present disclosure is shown in FIG. 4A.

FIG. 4A is a conceptual diagram of the layers in the receiver of a UE: the hardware layer HW 410, the digital signal processing (DSP) layer 420, the Hardware Abstract Layer (HAL) 430, the L1LC (Layer-1 LTE control) layer 440, and the Radio Resource Management (RRM) layer 450. The received signals are processed by each layer and the processed results provided to the layer above. Arrow 460 designates the signal path for search results, while arrow 470 designates the signal path for measurement results. Regarding the searches, RRM 450 schedules searches for nearby cells and HAL 430 prunes the search results for ghost cells ("SRCH pruning") before they reach RRM 450. Regarding the measurements, RRM 450 schedules the taking of measurements and HAL 430 performs post-processing to, for example, again prune ghost cells from the results ("MEAS pruning"), as indicated by arrow 470.

While FIG. 4A shows an embodiment of the present disclosure being implemented in the HAL layer, the present disclosure is not limited thereto, and other embodiments may have the detecting/pruning taking place in different layers, or have the detecting take place in one layer and the pruning in another, or may only prune the neighbor list generated from a search, or may only prune the ghost cells in the results from a measurement, etc.

Figure 4B:
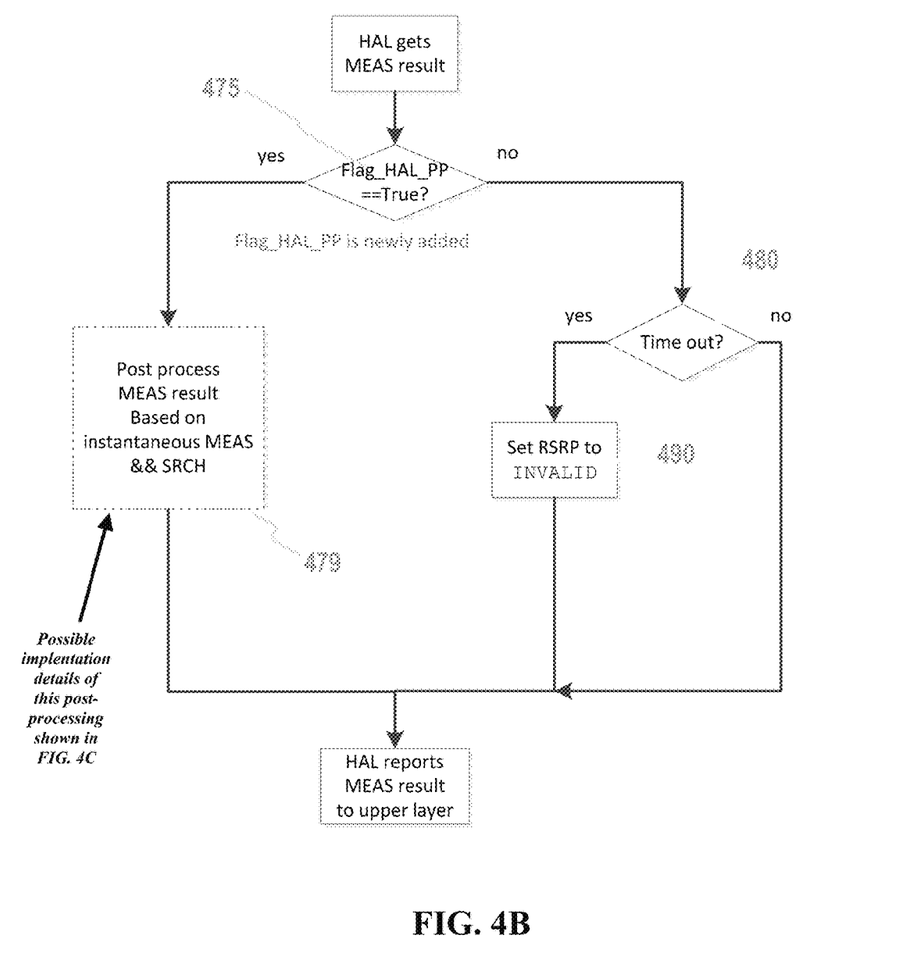
FIG. 4B is a flowchart of a measurement post-processing method performed by HAL 430 according to an embodiment of the present disclosure.

Continuing with the example provided in FIG. 4A, FIG. 4B is a flowchart of some of the pertinent steps in a measurement post-processing method (470) performed by HAL 430 in an embodiment of the present disclosure.

In FIG. 4B, HAL 430 receives the measurement results from DSP 420 and first determines, at 475, whether Flag_HAL_PP is set ("Flag_HAL_PP==True?"). In this embodiment, Flag_HAL_PP indicates whether there is HAL post-processing. If Flag_HAL_PP is set, the measurement results are post-processed based on the "instantaneous MEAS && SRCH" at 479, in order to refine the instantaneous measurement results by, e.g., filtering and ghost cell elimination.

If Flag_HAL_PP is not set at 475, HAL 430 determines whether there is a time out at 480. The timer is set considering factors such as the HW processing delay, the time to report measurement results to the network, etc., among other things, as would be understood by one of ordinary skill in the art. The timeout could have values from few milliseconds up to hundred milliseconds, as would be understood by one of ordinary skill in the art. If the timer times out at 480, the RSRP measurement value is considered invalid ("Set RSRP to INVALID") at 490. If the timer does not time out at 480, An example of the post-processing in 479 that may be performed by HAL 430 if Flag_HAL_PP is set at 475 is shown by the flowchart in FIG. 4C.

Figure 4C:
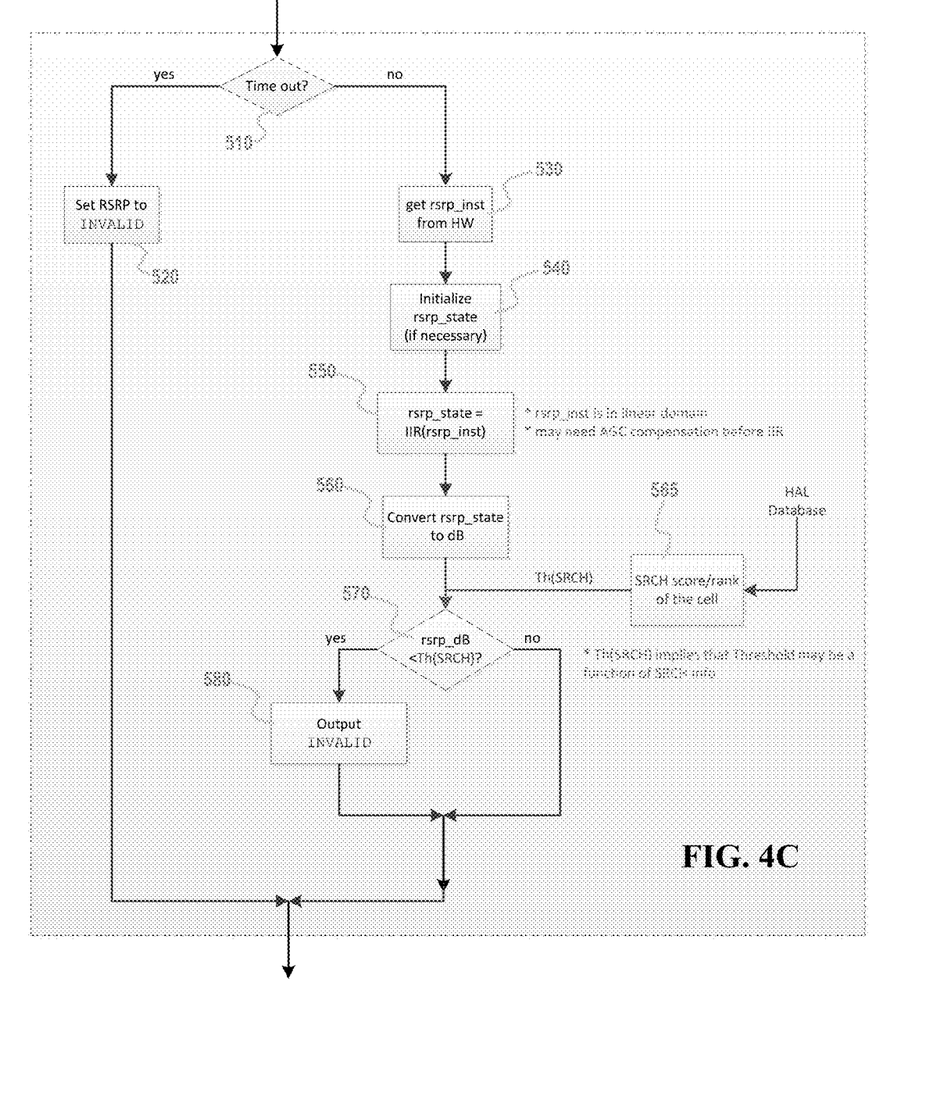
FIG. 4C is a flowchart of a possible implementation of a portion of the method shown in FIG. 4B according to an embodiment of the present disclosure.

In FIG. 4C, 510 and 520 are similar to 480 and 490 in the Flag_HAL_PP==False branch of FIG. 4B. At 530, the DSP 420 reads out the instantaneous measurement result from a register (the result having been calculated in HW, i.e., "get rsrp_inst from HW"). In some embodiments, DSP 420 may perform IIR (infinite impulse response) filtering on the instantaneous measurement results. In such embodiments, the IIR filter is initialized at 540 ("initialize rsrp_state (if necessary)") and the new instantaneous measurement result is fed to the IIR filter at 550 ("rsrp_state=IIR (rsrp_inst)"). The measurement results are converted from the linear domain into the power/decibel domain at 560 ("Convert rsrp_state to dB"). At 565, searcher information regarding the cells ("SRCH score/rank of the cell") from the HAL database are utilized to provide the RSRP threshold ("Th (SRCH)") to be used at 570. If the threshold is exceeded at 570 ("rsrp_dB>Th (SRCH)"), the measurement result is output as rsrp_dB and provided to the upper layer (returning to FIG. 4A). If not ("rsrp_dB<Th (SRCH)"), the RSRP measurement value is invalid at 580 ("Output INVALID").

As shown by the examples and representative embodiments above, methods, systems, and apparatuses according to the present disclosure provide accurate RSRP measurement results for true cells (i.e. existing cells) and the capability to detect ghost cells and consequently prevent ghost cells from being reported to the network and/or used by the UE in measurements. More specifically, methods, systems, and apparatuses according to the present disclosure use the cross-correlation between adjacent CRSs to both calculate the RSRP and to detect ghost cells. In that regard, ghost cells may be detected using only the sign (+/−) of the real part of the cross-correlations. Methods, systems, and apparatuses according to the present disclosure do not need noise power estimation or any denoising operations to calculate the RSRP and/or to detect ghost cells. Moreover, simulations indicate that RSRP measurement/ghost cell detection according to embodiments of the present invention is very robust, even under non-ideal conditions, such as, for example, residual timing and/or frequency error.

Depending on the embodiment of the present disclosure, steps and/or operations in accordance with the present disclosure may occur in a different order, or in parallel, or concurrently for different epochs, or in other variations, in different embodiments, as would be understood by one of ordinary skill in the art. Similarly, as would be understood by one of ordinary skill in the art, FIGS. 3, 4B, and 4C are simplified representations of the actions performed, and real-world implementations may perform the actions in a different order or by different ways or means. Similarly, as simplified representations, FIGS. 3, 4B, and 4C do not show other required steps as these are known and understood by one of ordinary skill in the art and not pertinent and/or helpful to the present description.

Depending on the embodiment of the present disclosure, some or all of the steps and/or operations may be implemented or otherwise performed, at least in part, on a portable device. "Portable device" as used herein refers to any portable, mobile, or movable electronic device having the capability of receiving wireless signals, including, but not limited to, multimedia players, communication devices, computing devices, navigating devices, etc. Thus, mobile devices include, but are not limited to, laptops, tablet computers, Portable Digital Assistants (PDAs), mp3 players, handheld PCs, Instant Messaging Devices (IMD), cellular telephones, Global Navigational Satellite System (GNSS) receivers, watches, cameras or any such device which can be worn and/or carried on one's person. "User Equipment" or "UE" as used herein corresponds to the usage of that term in the 3GPP LTE/LTE-A protocols, but is not in any way limited by the 3GPP LTE/LTE-A protocols. Moreover, "User Equipment" or "UE" refers to any type of device, including portable devices, which acts as a wireless receiver.

Depending on the embodiment of the present disclosure, some or all of the steps and/or operations may be implemented or otherwise performed, at least in part, using one or more processors running instruction(s), program(s), interactive data structure(s), client and/or server components, where such instruction(s), program(s), interactive data structure(s), client and/or server components are stored in one or more non-transitory computer-readable media. In some embodiments of the present disclosure, the one or more processors include radiofrequency (RF) baseband modem chips and/or a system on a chip (SoC).

The one or more non-transitory computer-readable media may be instantiated in software, firmware, hardware, and/or any combination thereof. Moreover, the functionality of any "module" discussed herein may be implemented in software, firmware, hardware, and/or any combination thereof. To clearly illustrate this interchangeability, various illustrative components, blocks, modules, circuits, and steps have been described above generally in terms of their functionality. Whether such functionality is implemented as hardware, firmware, software or some combination thereof depends upon the particular application and design constraints imposed on the overall system. One of ordinary skill in the art would understand how to implement the described functionalities in various ways depending on each particular application/implementation, but such specific implementation/application decisions should not be interpreted as causing a departure from the scope of the present disclosure.

The one or more non-transitory computer-readable media and/or means for implementing/performing one or more operations/steps/modules of embodiments of the present disclosure may include, without limitation, application-specific integrated circuits ("ASICs"), standard integrated circuits, controllers executing appropriate instructions (including microcontrollers and/or embedded controllers), field-programmable gate arrays ("FPGAs"), complex programmable logic devices ("CPLDs"), and the like. Some or all of any system components and/or data structures may also be stored as contents (e.g., as executable or other non-transitory machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of any system components and data structures may also be stored as data signals on a variety of non-transitory computer-readable transmission mediums, from which they are read and then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced in any computer system configuration.

Thus, the term "non-transitory computer-readable medium" as used herein refers to any medium that includes the actual performance of an operation (such as hardware circuits), that includes programs and/or higher-level instructions to be provided to one or more processors for performance/implementation (such as instructions stored in a non-transitory memory), and/or that includes machine-level instructions stored in, e.g., firmware or non-volatile memory. Non-transitory computer-readable media may take many forms, such as non-volatile and volatile media, including but not limited to, a floppy disk, flexible disk, hard disk, RAM, PROM, EPROM, FLASH-EPROM, EEPROM, any memory chip or cartridge, any magnetic tape, or any other magnetic medium from which a computer instruction can be read; a CD-ROM, DVD, or any other optical medium from which a computer instruction can be read, or any other non-transitory medium from which a computer instruction can be read.

While certain embodiments of the present disclosure have been shown and described herein, it will be understood by those of ordinary skill in the art that various changes in form and details may be made therein without departing from the spirit and scope of the present disclosure—i.e., the invention is not limited to any embodiments described herein, but is defined by the appended claims and their equivalents.

Problem Statement

It was observed in field tests and was reproduced in lab environment that occasionally UE will report non-exist (aka ghost) cells in its measurement report (MR). This has adverse impact from radio resource management point of view. Take the field issue for example. Automatic Neighbor Relation (ANR) procedure is initiated by eNB after UE reports ghost cell. Consequently, eNB asks UE to decode the SIB1 of the ghost cell, which is destined to fail. Therefore, it is important to design modem such that the false reporting of ghost cell is minimized. To this end, MPSW has worked on two aspects of modem design/enhancement. On one hand, efforts have been spent on enhancing the searcher design to reduce the false alarms. On the other hand, we have also work on measurement block, with the goal of better distinguishing between true cells from ghost cells.

In this document, we summarized our study on measurement. RSRP measurement using real part of cross-correlation is proposed. It is shown through simulation study that the proposed scheme can significantly reduce the power measurement of ghost cells and therefore can help UE better distinguish between true cells and ghost cells. Compared to the S333 HW implementation, the method requires HW to add a few additional registers while keeping the core design intact. Thanks to its simplicity and effectiveness, the method has been adopted in S340, which is referred to as coherent RSRP measurement method.

The rest of the document is organized as follows. We first describe the RSRP measurement using real part of cross-correlation in Section 0. In Section 0, Matlab experiments under ideal channel conditions are conducted, which is followed by Section 0 in which LLS simulation under more realistic scenarios are considered. In Section 0, we present an exemplary SW structure that can exploit the benefit of the new RSRP method.

Finally Section 0 concludes the report.

Sect. 2: RSRP Measurement Using Real Part of Cross-Correlation Under Ideal Scenario without TO/FO First of all, let us consider the case when there is no residual timing and frequency offset (TO/FO).

In S30x/333 MEAS block, RSRP is estimated based on cross-correlation of CRS tones. Depending on the CRS tone location, up to 3 groups of correlation will be computed in HW as shown in [FIG. 2].

Focusing on one group and denote the i-th pair of two CRS tones in frequency domain $Y_{i,1} = HS_{i,1}^s + N_{i,1}$, $Y_{i,2} = HS_{i,2}^s + N_{i,2}$ where $S_{i,j}^s$ j=1,2 denotes the two CRS symbols for serving cell, and the descrambled results can be expressed as follows:

$$R_{i,1} = (S_{i,1}^s)^*(HS_{i,1}^s + N_{i,1}), R_{i,2} = (S_{i,2}^s)^*(HS_{i,2}^s + N_{i,2})$$

Then, S30x/333 RSRP is given as[1]

[1] For the sake of completeness, it should mention that S30x/333 also supports another RSRP mode in which three groups of cross-correlations are first summed and then magnitude is taken. However, this mode suffers in cases where there is TO and/or FO and therefore is only applicable in more stable state where TO/FO is negligible.

$$RSRP(K) = \frac{\left|\sum_{i=1}^{K} R_{i,1}(R_{i,2})^*\right|_{group0} + \left|\sum_{i=1}^{K} R_{i,1}(R_{i,2})^*\right|_{group1} + \left|\sum_{i=1}^{K} R_{i,1}(R_{i,2})^*\right|_{group2}}{3K} \quad \text{(App-1)}$$

When ghost cell RSRP measurement is of interest, we will need to replace the descrambling sequence of serving cell by that of ghost cell, i.e., $$R_{i,1} = (S_{i,1}^g)^*(HS_{i,1}^s + N_{i,1}), R_{i,2} = (S_{i,2}^g)^*(HS_{i,2}^s + N_{i,2}) \quad \text{(App-2)}$$

where superscript g stands for ghost cell.

In theory, the RSRP information in contained in the real part of $$\sum_{i=1}^{K} R_{i,1}(R_{i,2})^*$$

in ideal scenario (e.g., static channel without timing and frequency error). Accordingly we can define $$\widetilde{RP}(K) = \frac{\text{Real}\left\{\left(\sum_{i=1}^{K} R_{i,1}(R_{i,2})^*\right)_{group0} + \left(\sum_{i=1}^{K} R_{i,1}(R_{i,2})^*\right)_{group1} + \left(\sum_{i=1}^{K} R_{i,1}(R_{i,2})^*\right)_{group2}\right\}}{3K} \quad \text{(App-3)}$$

In this report, comparison of the two RSRP method, which are referred to as Abs method and Real method respectively, is given based on Matlab/LLS simulation results.

Sect. 3: Matlab Simulation Results
  Matlab simulation setup:
  Static channel
  SNR=30 dB
  K=96 in RSRP calculation
  True cell, whose power is assumed to be unit (i.e., 1)
  Data loading on non-CRS tones: QPSK with same power as CRS
  True cell and ghost cells are using same RSRP method, either Abs( ) or
  Real( )

From the trace and PDF for RSRP estimate using Abs method, there was little difference between colliding and non-colliding ghost cells, since all of them descramble with random QPSK constellation and therefore statistically they are same.

In the PDF plot of the values using the Real method in the linear domain, we noticed that the PDFs of ghost cells have zero mean. In fact, it can be proven that for ghost cell measurement, we have $$E\{R\overline{SR}.P(K)\} = 0,$$
$$\text{Var}\{R\overline{SR}.P(K)\} = \frac{1}{K} \frac{|H|^4 + 2|H|^2 \sigma^2 + \sigma^4}{2}.$$

The fact that PDF is zero-centered implies that, for 50% of time, we can prune the ghost cells based on real part of correlation. This is not possible with Abs method.

RSRP is usually evaluated in dB domain. To translate $\overline{RSRP}$ (K) into dB domain, we first prune negative RSRP values (since true RSRP cannot be negative in linear domain) and this effectively reduces the false alarm by 50%. For positive values, we take 10*log 10( ) to convert it to dB. Therefore, the PDF plot for ghost cells should be interpreted as conditional PDF (conditioning on the fact that ghost cell shows positive energy).

If we compare the PDF of ghost cells for two methods, the Real method shows lower ghost cell RSRP measurement than the Abs method. Given the fact the Real method has additional advantage of reducing false alarm by 50%, it is preferable.

Sect 4: LLS Simulation Results
  a. Static Channel
  LLS simulations are performed. Simulation setup is as follows:
  Static channel
  RSRP sweep: [−119, −84] dBm
  Noc is fixed at −114 dBm/15 kHz, therefore SNR ranges from −5 to 30 dB
  1.4 MHz, 1Tx, 1 TTI measurement
  Data loading on non-CRS tones: 16-QAM with same power as CRS
  True cell and ghost cells are using same RSRP method, either Abs( ) or Real( )

The mean value of RSRP estimate was plotted for two methods, from which it was found:
  The two metric are equally good for true cell measurement
  For ghost cells, the two methods show big difference. The Real( ) method has smaller RSRP than the Abs( ) method, which is also seen in Matlab simulations
  For any given method, the results for two types of ghosts (colliding vs non-colliding) are more-or-less of the same behavior.

Thus, the LLS simulation also reveals the same behavior of ghost cells' PDF.

The tables below show the full data set for the two methods. Please note that for the real( ) method, ~50% time RSRP is negative and is pruned. The mean and std numbers in the table are conditional values (conditioning on positive RSRP).

TABLE APP-1

(Abs): Full mean/std results of LLS simulations
Abs Method

| SNR | True Cell (mean) | True Cell (std) | Colliding Ghost (mean) | Colliding Ghost (std) | Non-Colliding Ghost (mean) | Non-Colliding Ghost (std) |
|---|---|---|---|---|---|---|
| −5 | −118.62 | 1.64 | −120.82 | 1.54 | −120.84 | 1.53 |
| −4 | −117.75 | 1.54 | −120.56 | 1.54 | −120.58 | 1.54 |
| −3 | −116.82 | 1.4 | −120.25 | 1.54 | −120.27 | 1.54 |
| −2 | −115.85 | 1.25 | −119.89 | 1.53 | −119.91 | 1.54 |
| −1 | −114.86 | 1.1 | −119.47 | 1.52 | −119.49 | 1.53 |
| 0 | −113.86 | 0.97 | −119 | 1.51 | −119.02 | 1.53 |
| 1 | −112.85 | 0.86 | −118.46 | 1.49 | −118.49 | 1.52 |
| 2 | −111.85 | 0.75 | −117.87 | 1.48 | −117.9 | 1.52 |
| 3 | −110.85 | 0.67 | −117.23 | 1.47 | −117.25 | 1.51 |
| 4 | −109.85 | 0.59 | −116.54 | 1.45 | −116.56 | 1.51 |
| 5 | −108.85 | 0.52 | −115.8 | 1.44 | −115.81 | 1.5 |
| 6 | −107.85 | 0.46 | −115.02 | 1.42 | −115.03 | 1.5 |
| 7 | −106.85 | 0.41 | −114.2 | 1.41 | −114.21 | 1.5 |
| 8 | −105.84 | 0.37 | −113.35 | 1.39 | −113.35 | 1.49 |
| 9 | −104.84 | 0.33 | −112.47 | 1.37 | −112.47 | 1.49 |
| 10 | −103.85 | 0.29 | −111.57 | 1.35 | −111.57 | 1.49 |
| 11 | −102.85 | 0.26 | −110.65 | 1.33 | −110.65 | 1.48 |
| 12 | −101.84 | 0.23 | −109.71 | 1.32 | −109.71 | 1.47 |
| 13 | −100.85 | 0.21 | −108.76 | 1.3 | −108.77 | 1.47 |
| 14 | −99.84 | 0.18 | −107.8 | 1.29 | −107.8 | 1.46 |
| 15 | −98.84 | 0.16 | −106.83 | 1.28 | −106.83 | 1.46 |
| 16 | −97.85 | 0.15 | −105.87 | 1.26 | −105.86 | 1.46 |
| 17 | −96.84 | 0.13 | −104.88 | 1.26 | −104.88 | 1.45 |
| 18 | −95.84 | 0.12 | −103.9 | 1.25 | −103.9 | 1.45 |
| 19 | −94.85 | 0.1 | −102.92 | 1.25 | −102.91 | 1.45 |
| 20 | −93.84 | 0.09 | −101.92 | 1.24 | −101.92 | 1.45 |
| 21 | −92.85 | 0.08 | −100.94 | 1.24 | −100.93 | 1.45 |
| 22 | −91.85 | 0.08 | −99.95 | 1.24 | −99.94 | 1.45 |
| 23 | −90.85 | 0.07 | −98.95 | 1.23 | −98.94 | 1.45 |
| 24 | −89.85 | 0.06 | −97.96 | 1.23 | −97.95 | 1.45 |
| 25 | −88.85 | 0.06 | −96.97 | 1.23 | −96.95 | 1.45 |
| 26 | −87.85 | 0.05 | −95.96 | 1.23 | −95.95 | 1.45 |
| 27 | −86.85 | 0.05 | −94.97 | 1.23 | −94.96 | 1.45 |
| 28 | −85.85 | 0.04 | −93.98 | 1.23 | −93.96 | 1.45 |
| 29 | −84.85 | 0.04 | −92.97 | 1.23 | −92.96 | 1.45 |
| 30 | −83.85 | 0.04 | −91.98 | 1.23 | −91.96 | 1.45 |

TABLE APP-2

(Real): Full mean/std results of LLS simulations
Real Method

| SNR | True Cell (mean) | True Cell (std) | Colliding Ghost (mean) | Colliding Ghost (std) | Non-Colliding Ghost (mean) | Non-Colliding Ghost (std) |
|---|---|---|---|---|---|---|
| −5 | −119.46 | 2.47 | −126.67 | 4.9 | −126.7 | 5.02 |
| −4 | −118.29 | 1.93 | −126.44 | 4.92 | −126.34 | 4.89 |
| −3 | −117.19 | 1.64 | −126.08 | 4.82 | −126.02 | 4.9 |
| −2 | −116.11 | 1.35 | −125.68 | 4.71 | −125.72 | 5.04 |
| −1 | −115.05 | 1.16 | −125.36 | 4.84 | −125.29 | 4.98 |
| 0 | −114.01 | 1 | −124.85 | 4.76 | −124.76 | 4.94 |
| 1 | −112.98 | 0.87 | −124.43 | 4.8 | −124.33 | 5.12 |
| 2 | −111.95 | 0.77 | −123.99 | 4.93 | −123.74 | 5.24 |
| 3 | −110.94 | 0.67 | −123.41 | 4.84 | −122.9 | 4.89 |
| 4 | −109.92 | 0.6 | −122.7 | 4.66 | −122.15 | 4.89 |
| 5 | −108.91 | 0.53 | −122.03 | 4.61 | −121.39 | 4.91 |
| 6 | −107.9 | 0.47 | −121.39 | 4.63 | −120.59 | 4.82 |
| 7 | −106.9 | 0.41 | −120.7 | 4.67 | −119.69 | 4.75 |

TABLE APP-2-continued (Real): Full mean/std results of LLS simulations
Real Method

| SNR | True Cell (mean) | True Cell (std) | Colliding Ghost (mean) | Colliding Ghost (std) | Non-Colliding Ghost (mean) | Non-Colliding Ghost (std) |
|---|---|---|---|---|---|---|
| 8  | −105.88 | 0.37 | −119.94 | 4.58 | −118.81 | 4.75 |
| 9  | −104.88 | 0.33 | −119.11 | 4.43 | −117.95 | 4.83 |
| 10 | −103.88 | 0.29 | −118.46 | 4.69 | −117.07 | 4.9 |
| 11 | −102.87 | 0.26 | −117.7 | 4.75 | −116.06 | 4.77 |
| 12 | −101.87 | 0.23 | −116.9 | 4.75 | −115.1 | 4.77 |
| 13 | −100.87 | 0.21 | −116.08 | 4.7 | −114.14 | 4.73 |
| 14 | −99.86 | 0.18 | −115.26 | 4.73 | −113.15 | 4.7 |
| 15 | −98.86 | 0.16 | −114.4 | 4.76 | −112.2 | 4.71 |
| 16 | −97.86 | 0.15 | −113.56 | 4.84 | −111.3 | 4.84 |
| 17 | −96.86 | 0.13 | −112.55 | 4.61 | −110.27 | 4.74 |
| 18 | −95.86 | 0.12 | −111.71 | 4.85 | −109.31 | 4.79 |
| 19 | −94.86 | 0.1 | −110.82 | 4.89 | −108.38 | 4.89 |
| 20 | −93.85 | 0.09 | −109.83 | 4.85 | −107.35 | 4.81 |
| 21 | −92.86 | 0.08 | −108.87 | 4.84 | −106.37 | 4.86 |
| 22 | −91.86 | 0.08 | −107.98 | 5.01 | −105.39 | 4.87 |
| 23 | −90.85 | 0.07 | −107 | 5.05 | −104.36 | 4.78 |
| 24 | −89.85 | 0.06 | −106.01 | 5.01 | −103.4 | 4.87 |
| 25 | −88.86 | 0.06 | −105.06 | 5.16 | −102.38 | 4.79 |
| 26 | −87.85 | 0.05 | −104.08 | 5.18 | −101.42 | 4.92 |
| 27 | −86.85 | 0.05 | −103.09 | 5.25 | −100.41 | 4.85 |
| 28 | −85.86 | 0.04 | −102.07 | 5.25 | −99.47 | 5.01 |
| 29 | −84.85 | 0.04 | −101.07 | 5.33 | −98.45 | 4.95 |
| 30 | −83.85 | 0.04 | −100.01 | 5.22 | −97.46 | 4.96 | b. Post-TO/FO Compensation for REAL Method

While the discussion up to now focuses on ideal scenario when there is no TO and FO, in practice this assumption will not hold in general, especially in inter-frequency measurement case. Considering TO and FO, for static channel as example, if we denote H(k, l) as channel response at subcarrier k OFDM l in cases without TO/FO, then in the presense of TO/FO the channel response can be expressed as $$H(k+\Delta k, l+\Delta l) = H(k,l)\exp\left[j2\pi\left(\left(\frac{f_\epsilon}{f_{sub}}\right)\Delta l + (f_{sub}\cdot t_\epsilon)\Delta k\right)\right]$$

Therefore after cross-correlation of adjacent CRS tones we will have $$\exp\left[j2\pi\left(\left(\frac{f_\epsilon}{f_{sub}}\right)\Delta l + (f_{sub}\cdot t_\epsilon)\Delta k\right)\right] \quad \text{(App-4)}$$

as the phase rotation of the group.

To get some insights of the range of TO/FO, especially of the resulting phase rotation range, let us do some back-of-envelop calculation.

TO TO can be caused by the fundamental resolution of searcher, as well as possible clock drifting. For searcher, the time-domain of PSS search has resolution of 1/1.92Msamples/second, which implies ±8 Ts of maximum error. Assuming ±1 ppm of clock drifting (which is rather pessimistic for connected mode operation), over 360 ms duration (which is the worst case searching period), the timing error due to clock drift would be $$\pm 1\cdot 10^{-6} * 360 \text{ ms} * 30.72 \cdot \frac{10^3 Ts}{\text{ms}} = \pm 11\ Ts.$$

Therefore, the phase rotation due to composite timing error will be $$\exp[j2\pi(\pm(f_{sub}\cdot t_\epsilon)\Delta k)] = \exp[j2\pi(\pm(15\ k\cdot 19\ Ts) = 6)] = \exp[j2\pi(\pm 0.0057)]$$

which is rather small.

FO FO can be caused by LO drift as well as Doppler shift. Consider ±1 ppm LO drift at 3.5 GHz carrier frequency, the frequency error caused by LO will be 3.5 kHz. Next, consider mobility speed of 300 km/h (e.g., high-speed train scenario) at 3.5 GHz carrier frequency, the frequency drift due to Doppler will be $$\pm\frac{v}{c}f_c \approx \pm 1\ \text{kHz}.$$

Therefore, the composite frequency error can be as large as ±4.5 kHz, making the phase rotation in $$\exp\left[j2\pi\left(\frac{f_\epsilon}{f_{sub}}\Delta l\right)\right]$$

spans entire [−π,π] range (with Δl=4 in our case) for this worst case analysis.

As seen from the equation, when TO/FO exist, the correlations are subject to phase rotation. Due to phase rotation, we will lose energy when taking only the real part as RSRP. Therefore, we need to enhance (App-3)(App-3) by accounting for the phase rotation.

In what follows, we examine various ways of estimate and then compensate the phase rotations. After the compensation, REAL method will be applied to estimate RSRP.

i. 2-D Exhaustive Search

In "LLS_MEAS_TC_v3_rot.xlsx", a 2-D search of TO/FO is performed and compared to the non-compensated approach. In 2-D search:

FO is searched in range [−1500 1500] Hz
TO is searched in range [−16, 16] Ts
Then 2-D search is performed as $$RSRP = \max_{\{\theta_{FO}\in R_1, \phi_{TO}\in R_2\}} \text{Real}\left(\frac{\text{group}_0 e^{-j\phi_{TO}} + \text{group}_1 e^{j\theta_{FO}-\frac{\phi_{TO}}{2}} + \text{group}_2 e^{-j\theta_{FO}-\frac{\phi_{TO}}{2}}}{K}\right)$$

Where group$_0$ stands for the differential correlation result under TO/FO.

General observations are:

Post-TO-FO compensation is very effective to retrieve the power loss in the non-compensated approach.—No bias for serving cell now.

The compensation will boost the ghost cell power by ~2 dB. However, the gap to serving cell remains noticeably large (5 dB at low SNR and higher at high SNR)

ii. TO Estimation Plus FO Search

In "LLS_MEAS_TC_v4_rot_compare.xlsx", we simply the 2-D search by first performing TO estimate following 1-D FO search. This can be expressed as:

$$\widehat{TO} = \text{atan}\left(\frac{\text{group0.im}}{\text{group0.re}}\right)$$

$$RSRP = \max_{\{\theta_{FO} \in R_1\}} \text{Real}\left(\frac{\text{group}_0 e^{-j\widehat{\Phi_{TO}}} + \text{group}_1 e^{j\theta_{FO} - j\frac{\widehat{\Phi_{TO}}}{2}} + \text{group}_2 e^{-j\theta_{FO} - j\frac{\widehat{\Phi_{TO}}}{2}}}{K}\right)$$

As shown, TO is estimated based on group0. Similar to 2-D case, FO is searched in range [−1500 1500] Hz.

General observations are:

TO estimation plus FO search is as effective as 2-D search. No bias for serving cell now.

iii. TO Estimation Plus FO Estimation

Motivated by method2, we remove FO search and instead of performing FO estimate. To be exact, the algorithm can be expressed as follows[2]

1. We first estimate TO with group0

$$\widehat{\Phi_{TO}} = \text{angle}(\text{group}_0), \quad \text{(App-5)}$$

[2] We define short-hand notation $$\text{angle}(x) = \text{atan}\left(x \cdot \frac{\text{im}}{x} \cdot \text{re}\right).$$

2. The estimated TO is used to remove the TO phase rotation in group1 and group2; Then, we estimate FO based on group1 and group2 respectively; And finally, the estimated FO from group1 and 2 are averaged to get final FO estimate $$\widehat{\theta_{FO}} = \frac{\text{angle}\left(\text{group}_2 e^{-j\frac{\widehat{\Phi_{TO}}}{2}}\right) - \text{angle}\left(\text{group}_1 e^{-j\frac{\widehat{\Phi_{TO}}}{2}}\right)}{2} \quad \text{(App-6)}$$

3. finally, all groups are compensated with estimated TO and FO and then REAL method is applied for RSRP estimation.

$$\widehat{RSRP}_t = \text{Real}\left\{\text{group}_0 e^{-j\widehat{\Phi_{TO}}} + \text{group}_1 e^{j\widehat{\theta_{FO}} - j\frac{\widehat{\Phi_{TO}}}{2}} + \text{group}_2 e^{-j\widehat{\theta_{FO}} - j\frac{\widehat{\Phi_{TO}}}{2}}\right\} \quad \text{(App-7)}$$

Note that, in step 2, we estimate the FO for each group instead of combining the two groups. This is to not sacrifice the dynamic range of the a tan operation (e.g., the aggregate phase may wrap-around if two groups are combined).

The results are summarized below. It is shown that this simple approach shows comparable performance compared with 2-D search. As we analyzed above, TO is small while FO can be large. Therefore, in calculating TO(App-1), it is suffice to limit the output range to $$\left[-\frac{\pi}{4}, \frac{\pi}{4}\right].$$

For FO calculation, however, to extend the output range to [−π, π] (based on the sign and comparison of I/Q of input argument) is needed to address large FO.

Finally, if the above computation is to be done in SW, the calculations of a tan (for the sake of finding angle) and rotation can be done through LUTs in order to reduce the computation load of SW at the cost of additional memory to store a tan/cos/sin LUTs. Our proof-of-concept SW profiling (see below attachment) shows that it will take ~23 us for SW to finish the calculation of (App-5)-(App-9) for 9 cells (which is assumed to be the worst case of measurement load per each RRM scheduling).

c. Fading Channel and Multicell Simulation

In this section, we investigate the performance of RSRP estimation based on REAL method under fading channels and in multicell scenarios.

i. Fading Channel Performance

We considered ETU300 as an example and compare REAL method with default (ABS) method. As seen from the simulation, REAL method has comparable performance as the ABS method for true cell; while it has better (i.e., lower) estimate for ghost cells.

ii. Multicell Performance

The multicell performance was also evaluated. In multicell scenario, data loading is removed and the rest of simulation setup remains the same. As can be seen from the simulation, REAL method has comparable (and better in general) performance as the ABS method for true cell; while it has better (i.e., lower) estimate for ghost cells.

Sect. 5: Possible SW Structure

The proposed RSRP method may generate negative RSRP values in linear domain, which is a desired feature to indicate potential ghost cells. In order to make use of these negative RSRP values, one needs to modify the existing SW flow accordingly. In what follows, as an example, we outline one possible SW structure for reference purpose.

FIG. 4A shows the high-level picture of the logical interaction between HW, HAL, and RRM. On logical level, RRM schedules SRCH operation, and SRCH HW returns the results to RRM. As part of the ghost cell study effort, SRCH pruning mechanism has been added in HAL, which makes decision on ghost cell pruning based on information from SRCH HW After RRM gets information of cells, it will schedule measurement and expects returning message from lower layer One possible architecture is to add MEAS post-processing in HAL (similar to SRCH pruning), which is to make use of negative RSRP and (possibly SRCH info which is available in HAL)

Focusing on HAL, as shown in FIG. 4B, we would like to add a post-processing block on top of existing function.

Finally, FIG. 4C outlines one potential implementation of the post-processing block in HAL. In this example, the main idea is to do IIR filtering of raw RSRP measurement in linear domain, such that the negative RSRP measurements will be naturally taken into account and drags the IIR state low. To this end, SW may need to do AGC gain compensation in cases when different AGC gain state is used across measurements.

after IIR filtering, linear RSRP value is converted to dB and AGC gain is compensated. In this process, negative RSRP can be marked (e.g., as a very low dBm number)

the resulting dBm value is compared to a SRCH INFO-dependent threshold before reporting to upper layer. For example, the SSS power could serve as the baseline to design RSRP threshold. Note that this is just one possible realization of the general idea of combining SRCH INFO with MEAS in RSRP reporting process. Other (better) solution is possible.

Sect. 6: Conclusion

In this report, RSRP estimate using real part of correlation is proposed and evaluated. Simulation results (Matlab and LLS) show that the Real method is superior to Abs method. More specifically, the Real method shows comparable (or better) results as the Abs method for true cell, and at the same time, it shows much lower RSRP of the ghost cells. More importantly, the Real method also has the capability of pruning ghost cell based on negative RSRP values, which is not possible for the Abs method. As an example, a potential SW structure/algorithm change/modification is also outlined.

What is claimed is:

1. A method for user equipment (UE), comprising:
storing received cell-specific reference signals (CRSs);
calculating, from among the stored CRSs of a single antenna port of a single cell, cross-correlations between pairs of adjacent CRSs of the single cell in a single time-frequency frame, the CRSs of each pair of adjacent CRSs being adjacent to each other in the single time-frequency frame, wherein the pairs of adjacent CRSs include each possible pairing of adjacent CRSs in the single time-frequency frame;
summing the calculated cross-correlation values for each pair of adjacent CRSs of the single cell across the single time-frequency frame; and
determining the single cell is a ghost cell based on a sign value of a real part of the cross-correlation sums for each pair of adjacent CRSs of the single cell over the single time-frequency frame.

2. The method of claim 1, further comprising:
calculating the reference signal receive power (RSRP) of the single cell using the cross-correlation sums.

3. The method of claim 2, wherein the RSRP is calculated by using only the absolute values of the cross-correlation sums.

4. The method of claim 2, wherein the RSRP is calculated by averaging the cross-Correlation sums.

5. The method of claim 1, further comprising:
estimating any timing offset (TO) using the cross-correlation sums.

6. The method of claim 5, wherein estimating any TO comprises:
estimating any TO based on the I/Q values of cross-correlations of at least one pair of adjacent CRSs.

7. The method of claim 5, further comprising:
compensating for any TO using the estimated TO.

8. The method of claim 7, further comprising:
estimating any frequency offset (FO) using the estimated TO.

9. The method of claim 8, wherein estimating any FO comprises:
estimating any FO based on correlation sums of at least one pair of adjacent CRSs which have been compensated by the estimated TO.

10. The method of claim 9, further comprising:
compensating, for any FO using the estimated FO.

11. The method of claim 1, wherein the received CRSs are transformed into the frequency domain and descrambled before being stored.

12. A method for user equipment (UE), comprising:
storing cell-specific reference signals (CRSs) after the CRSs have been transformed into the frequency domain and descrambled;
calculating, from among the stored CRSs of a single antenna port of a single cell, cross-correlations between pairs of adjacent CRSs of the single cell in a single time-frequency frame, the CRSs of each pair of adjacent CRSs being adjacent to each other in the single time-frequency frame, wherein the pairs of adjacent CRSs include each possible pairing of adjacent CRSs in the single time-frequency frame;
summing the calculated cross-correlation values for each pair of adjacent CRSs of the single cell across the single time-frequency frame; and
determining the single cell is a ghost cell when a real part of the cross-correlation sums for each pair of adjacent CRSs of the single cell over the single time-frequency frame is a random number with a zero mean.

13. The method of claim 12, further comprising:
calculating the reference signal receive power (RSRP) for the single cell by averaging the cross-correlation sums.

14. The method of claim 12, further comprising:
estimating any timing offset (TO) using the cross-correlation sums.

15. The method of claim 14, further comprising:
compensating for any TO using the estimated TO.

16. The method of claim 15, further comprising:
estimating any frequency offset (FO) using the estimated TO.

17. A user equipment (UE), comprising:
one or more non-transitory computer-readable media, wherein at least one of the one or more non-transitory computer-readable media stores a set of instructions; and
one or more processors, wherein at least one of the one or more processors, when executing the set of instructions stored in the at least one of the one or more non-transitory computer-readable media, controls the UE to perform at least the following steps:
storing received cell-specific reference signals (CRSs) after they have been transformed into the frequency domain and descrambled;
calculating, from among the stored CRSs of a single antenna port of a single cell, cross-correlations between pairs of adjacent CRSs of the single cell in a single time-frequency frame, the CRSs of each pair of adjacent CRSs being adjacent to each other in the single time-frequency frame, wherein the pairs of adjacent CRSs include each possible pairing of adjacent CRSs in the single time-frequency frame;
summing the calculated cross-correlation values for each pair of adjacent CRSs of the single cell across the single time-frequency frame; and
determining the single cell is a ghost cell based on a sign value of a real part of the cross-correlation sums for each pair of adjacent CRSs of the single cell over the single time-frequency frame.

18. The UE of claim 17, wherein at least one of the one or more processors, when executing the set of instructions stored in the at least one of the one or more non-transitory computer-readable media, controls the UE to perform the following step:
using the cross-correlation sums for each pair over the frame to calculate the reference signal receive power (RSRP) for the cell.

19. The UE of claim 17, wherein at least one of the one or more processors, when executing the set of instructions stored in the at least one of the one or more non-transitory computer-readable media, controls the UE to perform the following step:
calculating, the reference signal receive power (RSRP) for the cell by averaging the cross-correlation sums.

20. The method of claim 2, wherein the RSRP is calculated by using only the real parts of the cross-correlation sums.

* * * * *